United States Patent
Tayal et al.

(10) Patent No.: US 12,554,434 B2
(45) Date of Patent: Feb. 17, 2026

(54) INPUT VOLTAGE DEGRADATION DETECTION

(71) Applicant: Micron Technology, Inc., Boise, ID (US)

(72) Inventors: Sumit Tayal, Brentwood, CA (US); Joseph A. Oberle, Sunnyvale, CA (US); David C. Sastry, El Dorado Hills, CA (US); Anil Kumar Agarwal, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 93 days.

(21) Appl. No.: 18/541,846

(22) Filed: Dec. 15, 2023

(65) Prior Publication Data

US 2024/0201893 A1 Jun. 20, 2024

Related U.S. Application Data

(60) Provisional application No. 63/433,826, filed on Dec. 20, 2022.

(51) Int. Cl.
*G06F 3/06* (2006.01)
(52) U.S. Cl.
CPC .......... *G06F 3/0655* (2013.01); *G06F 3/0604* (2013.01); *G06F 3/0653* (2013.01); *G06F 3/0679* (2013.01)

(58) Field of Classification Search
CPC .... G06F 3/0655; G06F 3/0604; G06F 3/0653; G06F 3/0679
USPC ......................................................... 714/721
See application file for complete search history.

(56) References Cited

U.S. PATENT DOCUMENTS

| | | | | |
|---|---|---|---|---|
| 8,971,138 | B2 * | 3/2015 | Seshadri | G11C 29/50016 714/719 |
| 9,432,298 | B1 * | 8/2016 | Smith | H04L 49/9057 |
| 2012/0047411 | A1 * | 2/2012 | Lai | G01R 31/31937 714/721 |
| 2012/0163074 | A1 * | 6/2012 | Franca-Neto | G11C 29/50004 365/185.24 |
| 2015/0082105 | A1 * | 3/2015 | Shah | G11C 29/44 714/721 |
| 2015/0212888 | A1 * | 7/2015 | Okamoto | G06F 3/0679 714/721 |

* cited by examiner

*Primary Examiner* — Albert Decady
*Assistant Examiner* — Enam Ahmed
(74) *Attorney, Agent, or Firm* — Brooks, Cameron & Huebsch, PLLC

(57) ABSTRACT

A method includes performing a self-initiated test memory operation of a memory device in a memory sub-system and detecting, via a sensor circuit, an input voltage or input current of the memory device or the memory sub-system. The method further includes determining whether the input voltage or the input current meets a degradation criteria and generating a management control signal responsive based on the determination whether the input voltage or the input current meets the degradation criteria.

20 Claims, 5 Drawing Sheets

INPUT VOLTAGE DEGRADATION DETECTION

PRIORITY INFORMATION

This application claims the benefit of U.S. Provisional Application No. 63/433,826, filed on Dec. 20, 2022, the contents of which are incorporated herein by reference.

TECHNICAL FIELD

Embodiments of the disclosure relate generally to memory sub-systems, and more specifically, relate to input voltage degradation detection.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
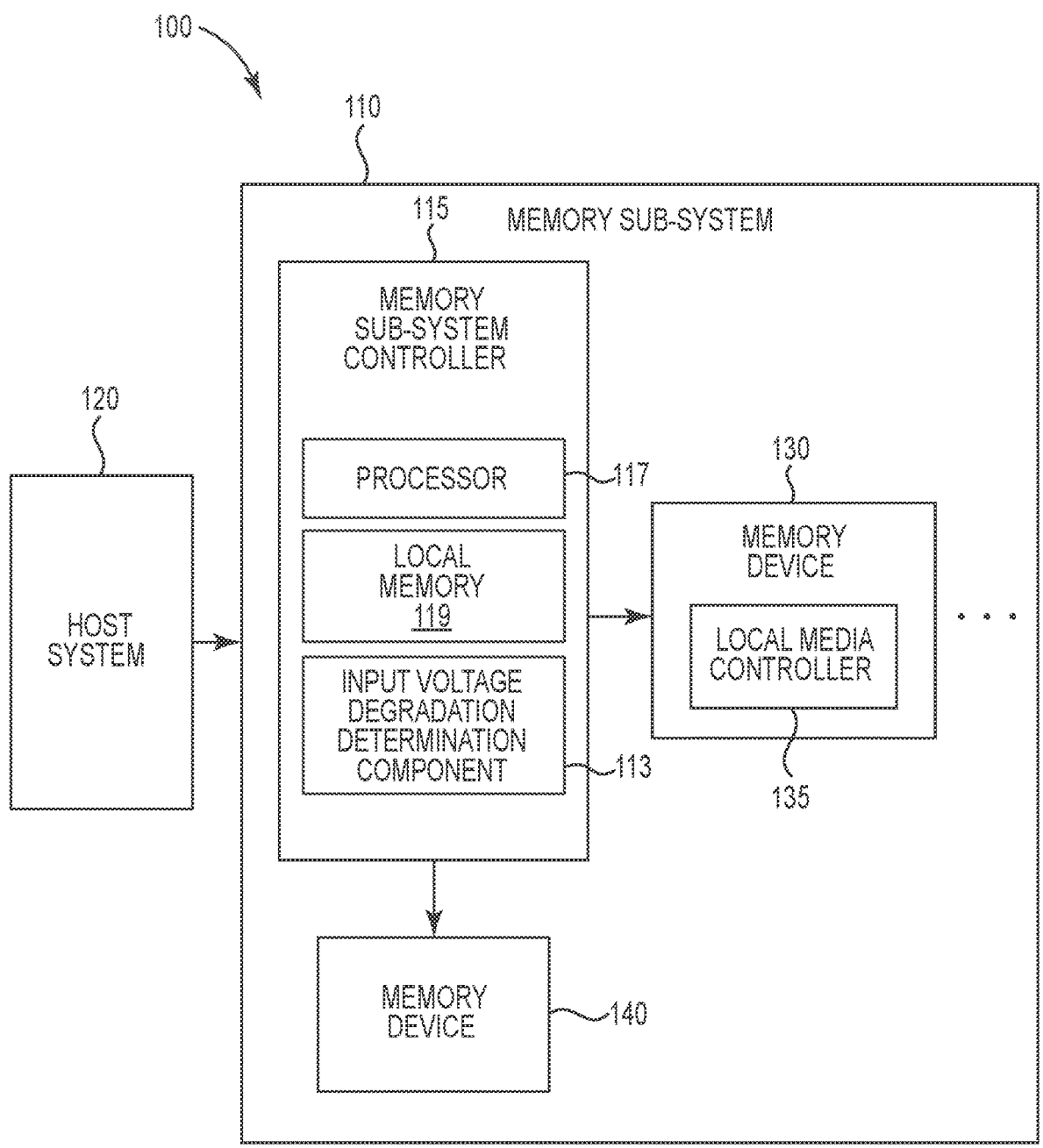
FIG. 1 illustrates an example of a computing system that includes a memory sub-system in accordance with some embodiments of the present disclosure.

Aspects of the present disclosure are directed to input voltage degradation detection and, in particular, to memory sub-systems that include an input voltage degradation detection component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

Power to memory sub-systems can be provided by various power supplies, which generally supply a voltage signal or current signal to one or more voltage regulators. The voltage regulator(s) then may seek to maintain a stable output voltage and provide the stable output voltage to various components of the memory sub-system. The input voltage can be generated by the memory sub-system or by electronic devices coupled thereto. For instance, a voltage regulator may be powered by an input voltage which can be a main power supply provided by a host, for example. In some instances, a voltage converter in a memory sub-subsystem may convert the received input voltage into output voltages. The output voltages can be employed as input voltages for various components such as a memory device included in the memory sub-system.

Generally, the voltage regulator(s) and/or voltage converters are able to maintain and provide the stable output voltage under normal operating conditions of the memory sub-system. However, voltage variation or voltage drop (e.g., IR drop) can occur as a voltage signal traverses signal paths to or in a memory sub-system. For instance, input voltage (or current) can vary (e.g., drop) due to various factors such as processing variations, operational condition variation, and/or due to sudden changes in loads experienced by components during operation of the memory sub-system, among other factors. As a result, the voltage regulator(s) can sometimes fail to supply a stable input voltage to components of the memory sub-system and/or the memory sub-system itself may experience an input voltage drop. For instance, an input voltage may drop to a level below an intended operation envelope of the memory sub-system and thus the memory sub-system may cease to function as intended (e.g., to accurately store/retrieve data).

As such, some approaches may seek to determine an amount of input voltage variation (e.g., IR drop) to a memory sub-system and/or a component in a memory sub-system at a point of manufacture. While such approaches may account for manufacturing differences, such approaches may not account for input voltage degradation due to changes in an operational environment and/or changes over the operational lifetime of a memory sub-system. Some other approaches may seek to determine the amount of variation of an input voltage during the operational lifetime of the memory sub-system. However, input voltages can vary due to the given state of a memory sub-system. For instance, input voltages can vary based on whether or not a memory operation associated with a memory device is being performed. Thus, such approaches may not reliably detect input voltage degradation. Moreover, such approaches may not permit a memory sub-system to initiate (self-initiate in the absence of signaling from a host) determination of an input voltage/current of a memory sub-system. The above issues can be further exacerbated in certain form factor memory sub-systems, particularly as memory sub-system development trends toward smaller devices that feature densely packed components and may therefore be prone to input voltage/current degradation.

In order to address these and other deficiencies of current approaches, embodiments of the present disclosure provide for input voltage degradation detection, as detailed herein. As used herein, an "input voltage" of a memory sub-system generally refers to a voltage signal (e.g., generated by host and/or a voltage regulator) received by the memory sub-system prior to alteration by and/or passing through regulator circuitry of the memory sub-system. As used herein, an "input voltage" of a component such as memory device in a memory sub-system generally refers to a voltage signal received by a memory sub-system that is altered by and/or passes through regulator circuitry (e.g., a voltage regulator and/or a load switch) in the memory sub-system prior to being provided as an input voltage to a memory device in the memory sub-system.

For instance, input voltage degradation, as detailed herein, can include performance of a self-initiated test memory operation of a memory device in a memory sub-system and subsequent detection of an input voltage or input current of the memory device or the memory sub-system. As used herein, a "self-initiated test memory operation" refers to a command issued by a processor of a memory device to cause the memory device to perform a particular operation (e.g., a read operation, a write operation, etc.) such that the input voltage of the memory device and/or an input voltage of a memory sub-system can be detected.

In some embodiments, the self-initiated test memory operation can be performed in the absence of signaling from a host. For instance, the memory sub-system can initiate and perform a self-initiated test memory operation periodically in the absence of signaling from a host and/or in the absence of permitting performance of memory operations associated with requests from the host. For instance, during performance of the self-initiated test memory operation any memory access requests (e.g., read/write requests) from the host can be stored in a queue and subsequently performed following completion of the self-initiated test memory operation.

Notably, in some embodiments, the input voltage or the input current can be detected while performing the self-initiated test memory operation. Moreover, approaches herein can employ the same type of self-initiated test memory operation (e.g., a plurality of the same read operations) and, in some instances, can determine a median, mean, or average input voltage/current. Thus, any input voltage/input current variation that may otherwise be present, for instance, due to performance of host-initiated test memory operations (e.g., read operations, write operations, etc.) can be mitigated to permit approaches herein to accurately determine any input voltage and/or input current degradation (e.g., drop) associated with a memory device and/or memory sub-system.

The detected input voltage (or input current) can be compared to a degradation criteria to determine whether the detected input voltage (or input current) meets the degradation criteria, as detailed herein. For instance, in some embodiments the degradation criteria can included in a plurality of degradation criteria to permit accurate determination of an input voltage and/or permit a particular response based on the degree of input voltage and/or input current degradation, as detailed herein. For example, a management control signal can be generated responsive to a determination that the degradation criteria is met (e.g., the detected input voltage or the detected input current is less than the degradation criteria).

Further, embodiments herein can perform a plurality of self-initiated test memory operations and determine a median or mean voltage drop or current drop and thereby further mitigate any noise/interference from other self-initiated test memory operations that may otherwise impeded accurate determination of input voltage or input current degradation. Additionally, embodiments herein permit a memory sub-system to initiate the test memory operations and/or permit a user of the host device to readily discern any input voltage or input current degradation, for instance, by storing data indicative of the input voltage or input current degradation in a data structure such as log table that is readily accessible by a host and/or can be provided via a notification to a host. Thus, input voltage determination as detailed herein mitigate any input voltage degradation, for instance, by readily detecting and notifying a host device that memory sub-system and/or a component in the memory sub-system is experiencing input voltage degradation and thus is in need of servicing and/or replacement in comparison to the approaches described above, thereby yielding an improvement in operation and/or an operational lifetime of the memory sub-system.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile computing device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via the same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include an input voltage degradation detection component 113. Although not shown in FIG. 1 so as to not obfuscate the drawings, the input voltage degradation detection component 113 can include various circuitry to facilitate determining respective dispersions of valid data portions within blocks, selecting a memory block based at least on the respective dispersions, and performing a folding operation on the selected memory block. In some embodiments, the input voltage degradation detection component 113 can include special purpose circuitry in the form of an ASIC, FPGA, state machine, controller, processor, and/or other logic circuitry that can allow the input voltage degradation detection component 113 to orchestrate and/or perform operations to input voltage degradation detection. In some embodiments, the input voltage degradation detection component 113 can include sensor circuit 214 and/or regulator circuitry 219 such as a voltage regulator and/or a load switch described in FIG. 2.

In some embodiments, the memory sub-system controller 115 includes at least a portion of the input voltage degradation detection component 113. For example, the memory sub-system controller 115 can include a processor 117 (processing device) configured to execute instructions stored in local memory 119 for performing the operations described herein. In some embodiments, the input voltage degradation detection component 113 is part of the memory sub-system 110, an application, and/or an operating system.

In a non-limiting example, an apparatus (e.g., the computing system 100) can include a memory sub-system input voltage degradation detection component 113. The memory sub-system input voltage degradation detection component 113 can be resident on the memory sub-system 110. As used herein, the term "resident on" refers to something that is physically located on a particular component. For example, the memory sub-system input voltage degradation detection component 113 being "resident on" the memory sub-system 110 refers to a condition in which the hardware circuitry that comprises the memory sub-system input voltage degradation detection component 113 is physically located on the memory sub-system 110. The term "resident on" may be used interchangeably with other terms such as "deployed on" or "located on," herein.

The memory sub-system input voltage degradation detection component 113 can be configured to perform or otherwise permit performance of a self-initiated test memory operation of a memory device 130/140 in a memory sub-system 110 and thereby permit detection of an input voltage or input current of the memory device 130/140 or the memory sub-system 110. The memory sub-system input voltage degradation detection component 113 can, in some embodiments, detect the input voltage or the input current while performing the self-initiated test memory operation associated with a memory device 130/140. The memory sub-system input voltage degradation detection component 113 can determine whether the detected input voltage (or input current) meets the degradation criteria and can generate a management control signal responsive to a determination that the degradation criteria is met, as detailed herein. In some embodiments, the input voltage degradation detection component 113 can generate a host notification when a notification threshold is meet (e.g., when the median input voltage or the median input current average input voltage meets a notification criteria and/or when a quantity of the respective input voltages or the respective input currents meets a notification threshold), as described herein.

Figure 2:
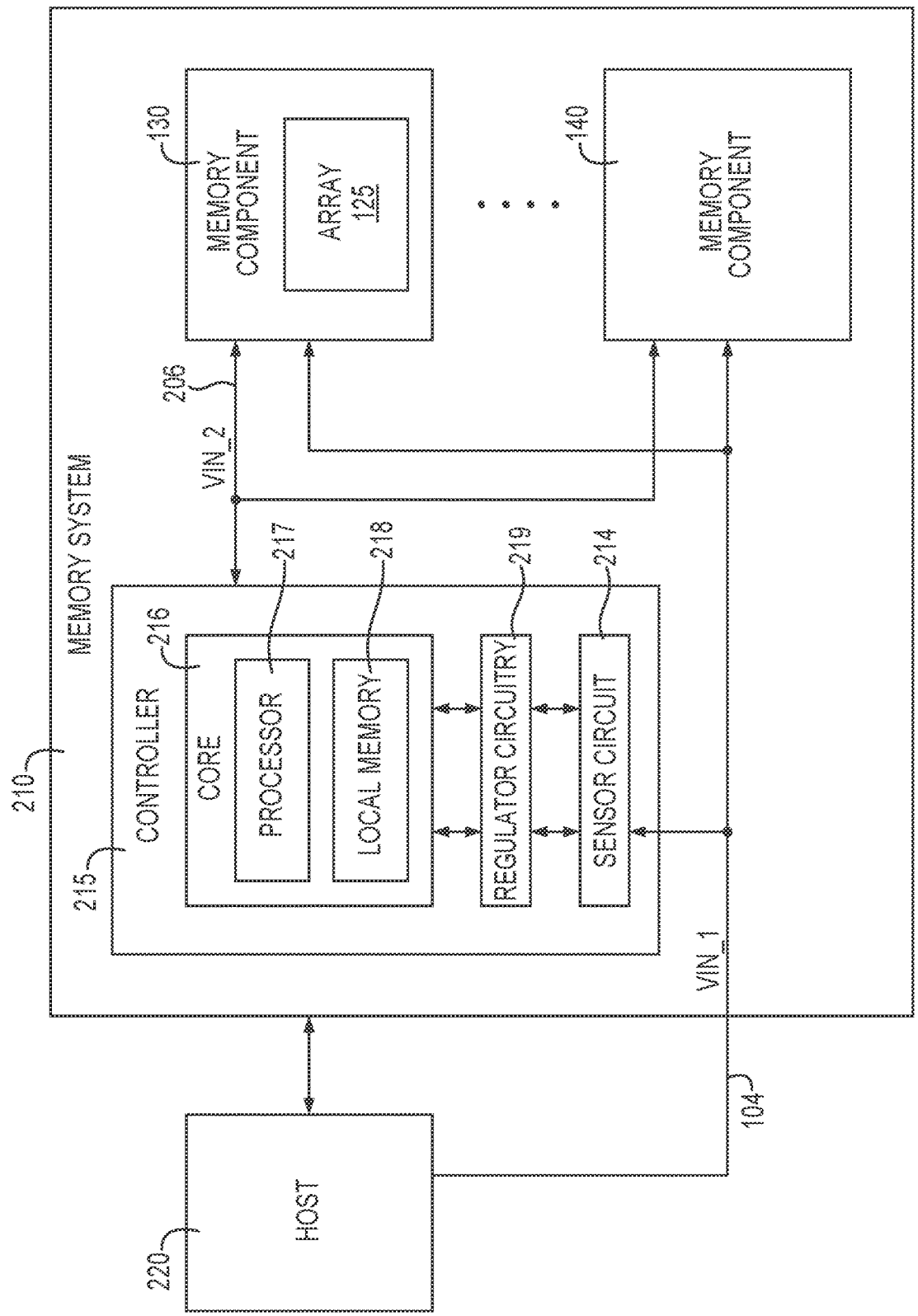
FIG. 2 illustrates another example of a computing system that includes a memory sub-system in accordance with some embodiments of the present disclosure.

FIG. 2 illustrates another example of a computing system that includes a memory sub-system (memory system) in accordance with some embodiments of the present disclosure. In some embodiments, a memory system 210 is a storage system. An example of a storage system is a solid-state drive (SSD). In some embodiments, the memory system 210 is a hybrid memory/storage sub-system. In general, the computing environment shown in FIG. 2 can include a host system that uses the memory system 110. For example, the host system can write data to the memory system 210 and read data from the memory system 210.

The host 220 and the memory sub-system 210 can be analogous or similar to the host 120 and the memory sub-system 110 in FIG. 1. For instance, the memory sub-system 210 can include a memory subsystem controller 215 and memory devices 230, 240. For example, memory device 230 can include a local media controller 235, as described herein. The memory sub-system controller 215 can include a processor 217, a local memory (a local memory array) 219, and an input voltage degradation detection component (not shown in FIG. 2) which can include the regulator circuitry 218 and/or the sensor circuit 214, as described herein.

In the example shown in FIG. 2, the host 220 can provide a first input voltage 204 (VIN_1) to the memory sub-system 210. The input voltage 204 can be various types of input voltages such as VCC, VCCQ, VCQ2, etc. As an example, the input voltage 204 can be 4.0 volts (V), 3.5 V, 3.3 V, or 3.0 V; however, embodiments are not limited to particular supply voltage values. In this example, input voltage 204 is provided via a voltage supply line to regulator circuitry 218, which is configured to provide power via a voltage supply line to various core circuitry 216 as well as to a memory interface between the controller 215 and the memory devices 230, 240. A second input supply voltage 206 (VIN_2) can be provided to the regulator circuitry 218 and to the memory devices to power various circuitry portions thereof.

The core circuitry 216 can include, for example, physical layer interface (PHY) circuitry, delay-locked loop (DLL) circuitry, phase-locked loop (PLL) circuitry, etc., in addition to processing circuitry such as processor 217. Although the memory sub-system 210 is shown as physically separate from the host 220, in a number of embodiments the memory sub-system 210 can be embedded within the host 220. Alternatively, the memory system 210 can be removable from the host 220.

As used herein, an "apparatus" can refer to various structural components. For example, the computing environment shown in FIG. 2 can be considered an apparatus. Alternatively, the memory system 210, the host 220, the controller 215, and the regulator circuitry 218 might each separately be considered an apparatus.

The sensor circuit 214 can include various hardware circuitry and/or circuitry components to detect voltage levels and/or current levels applied to the memory sub-system 210 and/or applied to a component in the memory sub-system 210 such a memory device 230/240. For instance, the sensor circuit 214 can detect a voltage supplied via voltage supply line (e.g., a rail) to the memory sub-system 210 and/or a memory device 230/240. For example, the sensor circuit 214 can be configured to transfer information indicative of an instantaneous voltage and/or current and/or a change in the current or the voltage, or both, associated with a voltage supply line.

The sensor circuit 214 can include various circuit components (e.g., delay circuits, detector circuits, etc.) that can allow for instantaneous voltages and/or currents to be determined. In some embodiments, the sensor circuit 214 (e.g., voltage tracking circuit(s), current tracking circuit(s), etc.) described herein can include various circuit components (e.g., delay lines, phase detectors, control circuits, etc.) that can allow for accurate and timely (e.g., instantaneous or near-instantaneous) detection of voltages, currents, or other signaling associated with a SoC, ASIC, FPGA, or other such hardware circuitry associated with the memory sub-system 210. In some embodiments, the sensor circuit 214 can be used to determine an actual (e.g., measured) voltage or current associated with the SoC, ASIC, FPGA, or other such hardware circuitry included in or coupled to the memory sub-system 210 and/or a memory device such as the memory devices 230, 240.

The regulator circuitry 218 that can include a load switch and/or one or more voltage regulators. A voltage regulator included in the regulator circuitry 218 can be configured to provide a voltage and/or current from an main input supply (e.g., input voltage VIN_1), for instance, via the load switch, as described herein, to components such as memory device as in input voltage (VIN_2). For example, the regulator circuitry 218 can also include a regulator such as other LDO regulators, buck regulator, boost regulator, buck-boost regulators, etc. Thus, a load switch can be configured to selectively provide a voltage and/or a current to a component such as memory component associated with the memory devices 230/240. For instance, a load switch can permit an input voltage and/or an input current to be supplied via a power rail to a memory device. In some embodiments, a load switch in the regulator circuitry 218 can permit an input voltage (VIN_2) to be supplied to memory device 230 and/or memory device 240. The input voltage (VIN_2) can be equal to, greater than, or less than, the input voltage (VIN_1) supplied to the memory sub-system 210.

The memory sub-system 210 can perform or cause performance of a self-initiated test memory operation. For instance, the controller 215 can transmit signaling to cause performance of the self-initiated test memory operation periodically and/or in response to an input. For example, the controller 215 can transmit signaling to cause performance of the self-initiated test memory operation periodically at a given time interval (e.g., weekly, daily, hourly, and/or after a given quantity of minutes has elapsed, etc.). Alternatively, or in addition, the controller 215 can transmit signaling to cause performance of the self-initiated test memory operation responsive to an input such as system input (e.g., a change in a flag or other condition of the memory sub-system 210).

As used herein, a test memory operation refers to a preset read operation, a preset write operation, a preset erase operation, or any combination thereof, that encumbers the memory device to permit reliable detection of an input voltage and/or input current of the memory device 230, 240 and/or the memory sub-system 210. For instance, the test memory operation can be a sequence of a plurality of read operations, write operations, and/or erase operations. Each of the test memory operations in a sequence of test operations can be the same type of test memory operation. For instance, each of the test memory operations can be the same read operation which is performed a plurality of times. Having each of the test memory operations be the same test memory operation can promote and/or permit reliable and accurate detection of an input voltage and/or input current of the memory device 230, 240 and/or the memory sub-system 210, for instance by encumbering the memory device and/or memory sub-system with the same or similar computational overhead/network traffic, etc. associated with performance of the same test memory operation. For instance, each respective read operation can be the same read operation which is performed at different times. Notably, utilizing the same test memory operation in a sequence can permit reliable detection of an input voltage and/or input current of the memory device, and yet can avoid any corruption of and/or erasing of host data stored on the memory device.

The controller 215 can detect, via the sensor circuit 214, an input voltage or input current of a memory device (e.g., the memory device 230 and/or the memory device 240) and/or the memory sub-system 210. As used herein, the sensor circuit 214 refers to a component including circuitry to detect the input voltage and/or input current of the memory device 230 and/or the memory device 240. For instance, the sensor circuit 214 can include voltage detection circuitry, current detection circuitry, or both. For example, the sensor circuit 214 can include voltage detector circuitry that can sample an input voltage (e.g., VIN_1 and/or VIN_2) and can output a signal indicative of the input voltage to another component such as the processor 217 included in the controller 215. While illustrated in FIG. 2 as being at a particular location in the memory sub-system 210, the sensor circuit 214 can be located at a different location in the memory sub-system 210 in some embodiments.

While illustrated in FIG. 2 as including an individual sensor circuit, in some embodiments that memory sub-system 210 can include a plurality of respective sensor circuits. For instance, the memory sub-system 210 can include a plurality of sensor circuits including a first sensor circuit to sample an input voltage (e.g., VIN_1) or input current associated with the memory sub-system 210 and a second sensor circuit associated with an input voltage (e.g., VIN_2) or input current associated with a memory device. In such embodiments, a respective signal from each of a plurality of respective sensor circuits representative of an input voltage or an input current detected by each of the plurality of respective sensor circuits (or by a subset of the plurality of sensor circuits) can be received by the controller 215.

For clarity, receiving respective signals from each of the plurality of respective sensor circuits is intended to mean that each sensor circuit (e.g., each respective sensor circuit) generates at least one signal (e.g., a respective signal) that is indicative of an input voltage or an input current detected by that respective sensor circuit. For example, if there are two sensor circuits, sensor circuit "A" and sensor circuit "B," sensor circuit "A" generates at least one signal indicative of an input voltage or an input current detected by sensor circuit "A" and sensor circuit "B" generates at least one signal indicative of an input voltage or an input current detected by sensor circuit "B."

The controller 215 can determine whether the detected input voltage and/or the detected input current of the memory device and/or the memory sub-system meets a degradation criteria. As used herein, a "degradation criteria" refers to a threshold value indicative of input voltage and/or input current degradation relative to a designed operational input voltage of a memory device and/or a memory subs-system. For instance, the degradation criteria can be equal to a value (e.g., 2.9 V) that is less than or equal to a designed operational input voltage (e.g., 3.0 V) of a memory device and/or a memory sub-system.

In some embodiments, the degradation criteria can include a plurality of degradation criteria. For example, a degradation criteria can include a first degradation criteria, a second degradation criteria, and a third degradation criteria, among other possibilities. Each of the degradation criteria can correspond to a different input voltage and/or different input current threshold. Stated differently, each of the degradation criteria can have a respective value that is different than the other degradation criteria. For example, second degradation criteria can be a value that is less than a value of a first degradation criteria. Similarly, the third degradation criteria can be a value that is less than a value of the first degradation criteria and that is greater than a value of the second degradation criteria. Having a plurality of degradation criteria can permit accurate determination of an input voltage, for instance even when the granularity of voltage and/or current detection provided via the sensor circuit 214 may not otherwise provide such granularity. For instance, due to size, cost and/or operation (e.g., power) constraints, the sensor circuit 214 itself may permit detection of whether a given input current and/or a given input voltage is different than (e.g., less than) a degradation criteria.

Figure 3:
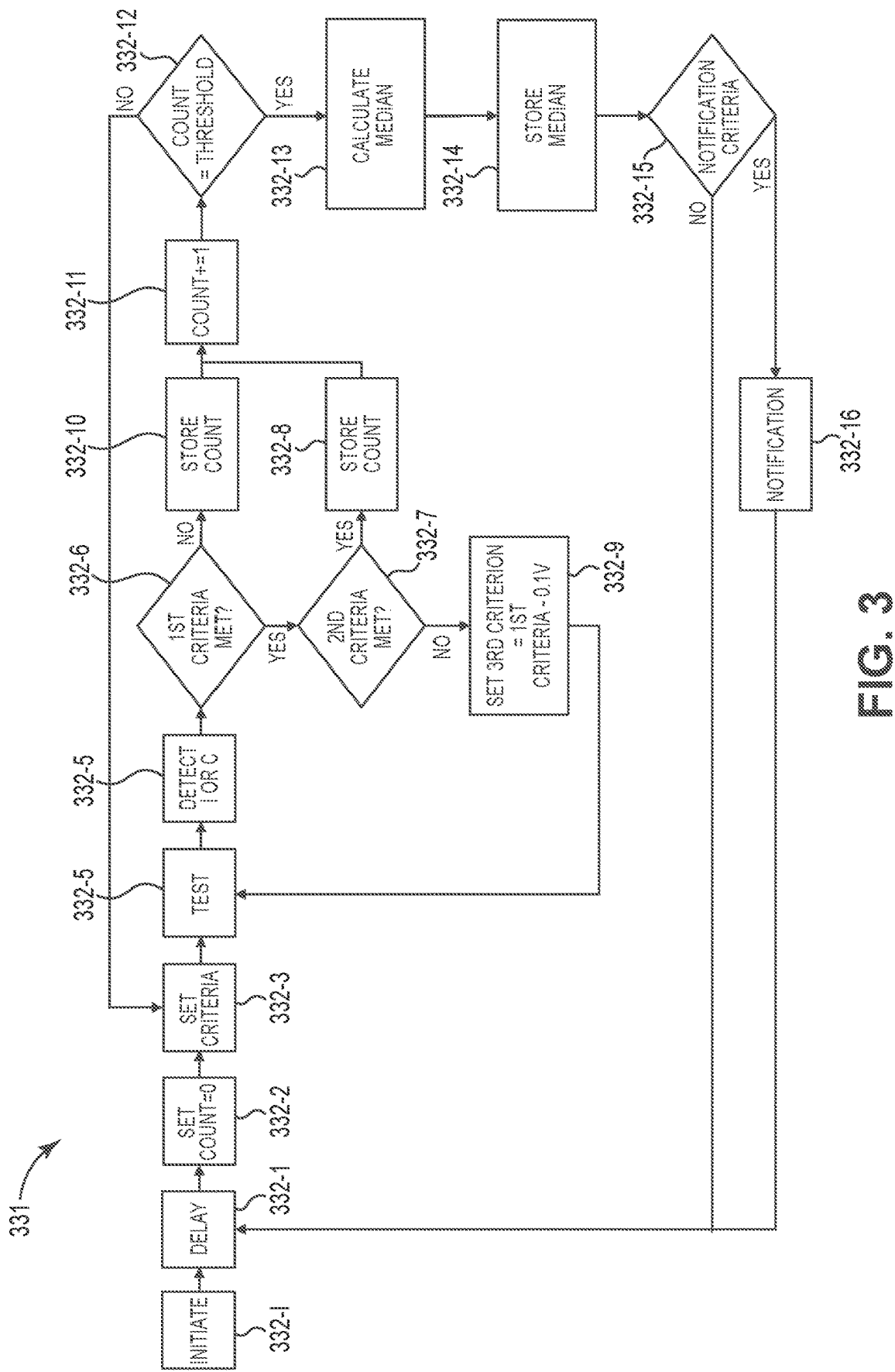
FIG. 3 illustrates a flow diagram corresponding to input voltage degradation detection in accordance with some embodiments of the present disclosure.

Thus, approaches herein can employ a plurality of degradation criteria to permit iterative detection of a particular input voltage and/or particular input current value or range, as described in greater detail in FIG. 3. As such, approaches herein can provide for reliable and accurate input voltage and/or input current degradation detection and/or can provide a notification, as detailed herein, based on detection of the input voltage/current degradation of a potential future system. Accordingly, approaches herein can permit a memory device and/or a memory sub-system experiencing input voltage and/or input current degradation to be serviced and/or replaced in a non-emergency manner. In contrast, some other approaches may only employ an individual voltage/current threshold at which a memory device and/or memory sub-system is no longer functional and thereby may be prone to data loss and/or unexpected memory device and/or memory-sub system failure.

FIG. 3 illustrates a flow diagram corresponding to input voltage degradation detection in accordance with some embodiments of the present disclosure. At 332-1, a flow 331 can be started or initiated by a controller of a memory sub-system (e.g., receipt by a controller in the memory sub-system). For instance, the controller can initiate the flow 331 periodically or responsive to an occurrence of a system event (e.g., responsive to power-up of the memory sub-system, etc.) in a condition of the memory sub-system.

Responsive to initiation at 332-1, the flow can proceed to 331-1. At 331-1 a delay can be imparted. For instance, a delay can be imparted based on a value or change in value of a clock (e.g., a real-time clock) included in the memory sub-system. The delay can be imparted to avoid any residual impact (e.g., residual voltage and/or current) associated with a host-initiated memory operations and/or a previously performed self-initiated test memory operation on an input voltage and/or input current to the memory sub-system and/or memory device. Moreover, imparting the delay can reduce a frequency of occurrence of the self-initiated test memory operations to an interval (e.g., 20 minute interval, etc.) that is suitable for purposes of detection of any input voltage/current degradation and yet mitigates any impact of the input (e.g., computation overhead, power consumption, etc.) associated with the voltage/current degradation detection. The delay can be imparted for a given quantity of seconds, a given quantity of minutes, and/or a given quantity of hours. For instance, in some embodiments the self-initiated test memory operation can be performed periodically at a given interval (e.g., every 20 minutes, etc.). Stated differently, in some embodiments, a given self-initiated test memory operation can be performed a threshold amount of time after performance of a previous self-initiated test memory operation.

Responsive to imparting the delay, the flow 331 can proceed to 332-2. At 332-2 a count stored in a data structure such as look-up table, etc. can be reset. For instance, the count can be reset to "0", among other possible values. The count can refer to a quantity of self-initiated test operations and/or a quantity of resultant values (e.g., detected input current and/or detected input voltage values) associated with a quantity of self-initiated test operations.

Responsive to reset of the value at 332-2, the flow 331 can proceed to 332-3. At 332-3 a degradation criteria can be set. The degradation criteria can be set to value that is equal to or less than a value of a designed operational input voltage and/or designed operational input current of a memory device and/or a memory subs-system. In some embodiments, the degradation criteria can be value (e.g., 3.0 V) that is equal to designed operational input voltage (e.g., 3.0 V) and/or designed operational input current of a memory device and/or a memory subs-system. However, in some embodiments the degradation criteria can be value (e.g., 2.9 V) that is less than designed operational input voltage (e.g., 3.0 V) and/or designed operational input current of a memory device and/or a memory subs-system. A controller (e.g., the memory sub-system controller 115 and/or the input voltage degradation detection component 113 of FIG. 1) in the memory sub-system can set a value of the degradation criteria. The controller can set a value of the degradation criteria based on a value stored in a memory device or other component in the memory device and/or based on a value provided to the controller by the host, among other possibilities. In some embodiments, the first degradation criteria and/or the second degradation criteria can be set at 332-3.

Responsive to the degradation criteria being set at 332-3, the flow 331 can proceed to 332-4. At 332-4, a self-initiated test memory operation can be performed on a memory device. For instance, at least one self-initiated test memory operation included in a sequence of self-initiated test memory operations can be performed at 332-4 prior to proceeding to 332-5. In some embodiments, a sequence of consecutive read operations associated with a memory device can each be performed on the same memory device and/or the same location/data in the memory device. For instance, each read operation of the successive sequence of consecutive read operations can be performed on the same NAND memory device and/or on the same associated with a memory device the same location/data in the NAND memory device. An individual self-initiated test memory operation included in a sequence of self-initiated test memory operations can be performed at 332-4 and other operations can be performed (e.g., at 332-6) prior to performing any additional self-initiated test memory operation included in the sequence of self-initiated test memory operations, in some embodiments.

Responsive to performance of one or more of the self-initiated test memory operations at 332-4, the flow 331 can proceed to 332-5. For instance, responsive to a performance (e.g., initiation) of an individual self-initiated test memory operation at 332-4, the flow 331 can proceed to 332-5. At 332-5, an input voltage or input current of the memory device or the memory sub-system can be determined by a sensor circuit, as described herein. The input voltage or the input current can be detected by the sensor circuit while performing the self-initiated test memory operation at 332-4. For instance, the input voltage or the input current can be detected by the sensor circuit subsequent to initiation of (e.g., subsequent to transmission by the controller of signaling indicative of the self-initiated test memory operation to a memory device associated with the self-initiated test memory operation) but prior to or concurrently with return of data from the memory device associated with the self-initiated operation to the host. Such detection of the input voltage or the input current while performing the self-initiated test memory operation can ensure reliable and accurate detection of any input voltage degradation and/or input current degradation.

In some embodiments, the input voltage or the input current can be detected by the sensor circuit in the absence of host-initiated activities associated with the memory device (the memory device associated with the self-initiated test memory operation) to promote reliable and accurate detection of any input voltage degradation and/or input current degradation. For instance, the self-initiated test operation (e.g., a self-initiated read operation) can be performed a threshold amount of time (e.g., 1 microsecond, 5 microsecond, 15 microseconds, etc.) after (subsequent to) performance of any host-initiated memory operation and thereby avoid any residual impact (e.g., residual voltage and/or current) associated with the host-initiated memory operations on an a detected input voltage and/or detected input current.

In some embodiments, a plurality of self-initiated test memory operations such as a sequence of the same type (e.g., read operation) can be performed. In such embodiments, a sensor circuit can detect a respective input voltage and/or a respective input current of the memory device or the memory sub-system, for each self-initiated test memory operation of the plurality of host-initiated test memory operations included in a sequence.

Responsive to detection of the input voltage and/or input current, the flow 331 can proceed to 332-6. At 332-6 the detected input voltage and/or detected input current can be compared to a first degradation criteria (a first criteria). In some embodiments, the first degradation criteria (e.g., 3.0 V, 2.9 V, etc.) can be an input voltage degradation criteria. In such embodiments, the sensor circuit can detect an input voltage of a memory system and/or a memory device that can be compared at 332-6 to the input voltage degradation criteria. Similarly, in some embodiments the first degradation criteria can be an input current degradation criteria and the sensor circuit can detect an input current of a memory system and/or a memory device that can be compared at 332-6 to the input current degradation criteria.

Responsive to a determination that the detected input voltage and/or detected input current meets (e.g., is less than the first degradation criteria) the first degradation criteria (e.g., 2.9 V), the flow 331 can proceed to 332-7.

At 332-7, the detected input voltage and/or detected input current can be compared to a second degradation criteria (a second criteria). The second degradation criteria, similar to the first degradation criteria, can be an input voltage and/or an input current degradation criteria. The second degradation criteria can be the same type of criteria as the first degradation criteria. For instance, when the first degradation criteria is a voltage degradation criteria the second degradation criteria can be a voltage degradation criteria that has a different value than the first voltage degradation criteria. For example, the second degradation criteria can have a value (e.g., 2.5 V) that is less than a value (e.g., 2.9 V) of the first degradation criteria.

Responsive to a determination that the detected input voltage and/or detected input current does not meet (e.g., is greater than the second degradation criteria) the second degradation criteria, the flow can proceed to 332-9. At 332-9, a third degradation criteria can be set. The third degradation criteria, similar to the first degradation and second degradation criteria, can be an input voltage and/or input current degradation criteria. The third degradation criteria can be the same type of criteria as the first degradation criteria and the second degradation criteria. For instance, when the first degradation criteria is a voltage degradation criteria the second degradation criteria and the third degradation criteria can each be a voltage degradation criteria that have different values than the first voltage degradation criteria. For example, the third degradation criteria can have a value (e.g., 2.8 V) that is a threshold value (e.g., 0.1 V, 0.2 V, etc.) less than a value (e.g., 2.9 V) of the first degradation criteria but is greater than a value (e.g., 2.5 V) of the second degradation criteria. That is, the third degradation criteria can be a value that is incremented at least one threshold quantity less than a value of the first degradation criteria.

Responsive to the third degradation criteria being set, the flow 331 can return to 332-1. At 332-1, a delay can be imparted and the flow can proceed to 332-2, 332-3, and subsequently to 332-4. At 332-4, one or more additional self-initiated test memory operations can be performed. At 332-5, one or more additional input voltages (e.g., a third input voltage) can be determined, for instance, while performing (e.g., responsive to initiation of) the additional self-initiated test memory operation. Subsequently, at 332-6 the additional input voltages can be compared to a value such as a value of the third degradation criteria (which has since replaced the initial value of the first degradation criteria). Employing a plurality of degradation criteria (e.g., at least the first degradation criteria and the second degradation criteria), can permit timely and accurate detection of any input voltage degradation and/or input put current degradation. For instance, the plurality of degradation criteria (e.g., the first degradation criteria, the second degradation criteria, and the third degradation criteria) can collectively function as an in-device comparator which can iterate until an actual input voltage and/or an actual input current is determined.

Responsive to a determination that a detected input voltage and/or detected input current does not meet (e.g., is equal to or greater than) the first degradation criteria, the flow 331 can proceed to 332-10. Similarly, responsive to a determination that the detected input voltage and/or detected input current meets (e.g., is equal to the second degradation criteria) the second degradation criteria, the flow can proceed to 332-8.

At 332-8 and 332-10, a value indicative of the detected input voltage and/or detected input current can be stored in a data structure such as a look-up table, a log entry, or otherwise stored. For instance, at 332-8 a value of the detected input current and/or the detected input voltage that is equal to second degradation criteria can be stored. Similarly, at 332-10 a value of the detected input current and/or the detected input voltage that is equal to or greater than the first degradation criteria can be stored. In some embodiments, a management control signal can be generated to store the value indicative of the detected input voltage and/or detected input current in the data structure. For instance, the management control signal can be emitted by the controller of a memory sub-system to cause a value indicative of the detected input voltage and/or detected input current can be stored in the data structure.

Responsive to storage of the value at 332-8 or 332-10, the flow 331 can proceed to 332-11. At 332-11, a counter can be incremented. For instance, a counter can be incremented for each value stored at 332-8 and 332-10. The counter can be located in the controller or otherwise located in the memory sub-system. The counter can count a total quantity of values stored in the data structure. In some embodiments, a management control signal can be generated to increment the counter. For instance, the management control signal can be generated by the controller of a memory sub-system to cause a value of a counter to be incremented and, in some embodiments can cause an incremented value to be stored in a data structure.

Responsive to incrementing of the counter, the flow can proceed to 332-12. At 332-12, the incremented value of the counter can be compared to a count threshold. As an example, the count threshold can be equal to 10, among other possibilities. The comparison (along with various other operations described herein) can be performed by a controller in a memory sub-system.

Responsive to a determination that the count threshold is not met (e.g., the incremented value of the counter is less than the count threshold), the flow 331 can return to 332-3. Responsive to a determination that the threshold count value is met (e.g., the incremented count value is equal to the threshold count value), the flow 331 can proceed to 332-13.

At 332-13, an average, mean, or median value or other mathematical value derived from respective input voltages and/or respective input currents associated with each of the counts (e.g., each of the self-initiated test memory operations) can be determined. For instance, a median value can be determined. Determining the average, mean, or median value of the respective input voltages and/or input currents can mitigate any variation that may otherwise be present due in the detected input voltages/currents, for instance, due to differences in an operational state of the memory sub-system while performing respective ones of a plurality of self-initiated test operations.

The average, mean, or median value determined at 332-13 can be stored. For instance, an entry indicative of or equal to the average, mean, or median value can be stored in a data log that is accessible by the controller of memory sub-system, the host, or both. For example, a data log can be a Get Log Page that is accessible by the controller of memory sub-system, the host, or both.

At 332-15, it can be determined whether a notification criteria is met. The notification criteria can be equal to a given value and/or given quantity. For instance, in some embodiments, the notification criteria can be a first notification criteria that is equal to a given value that can be compared to median input voltage/current and/or an average input voltage/current. In such embodiments, a host notification can be generated when the median input voltage/current and/or the average input voltage/current meets (e.g., exceeds) the notification criteria.

In some embodiments, the notification criteria can be a second notification criteria that is equal to a given quantity of input voltage/current values that meet a particular degradation criteria such as the first voltage degradation criteria and/or the second voltage degradation criteria. For instance, a notification can be generated when given quantity (e.g., two) of consecutive values associated the given quantity of consecutive self-initiated test memory operations each meet a degradation criteria such as the second voltage degradation criteria. Similarly, a notification can be generated when a given quantity (e.g., 3) of values associated with a given quantity of consecutive self-initiated test memory operations (e.g., five) meet a degradation criteria such as the second voltage degradation criteria. For instance, in some embodiments as notification can be provided when either condition i) a given quantity (e.g., two) of consecutive values associated the given quantity of consecutive self-initiated test memory operations each meet a degradation criteria such as the second voltage degradation criteria or condition ii) a given quantity of consecutive self-initiated test memory operations (e.g., five) meet a degradation criteria such as the second voltage degradation criteria, is met.

Responsive to a determination that the notification criteria is met, the flow 331 can proceed to 332-16. At 332-16, a notification can be generated. For instance, a notification can be generated and transmitted to a host. The notification can provide an indication that the memory sub-system 210 is experiencing input voltage and/or input current degradation. The notification can be provided in the form of signaling indicative of the median input voltage or the median input current in a data log that is provided to a host, among other possibilities. Accordingly, approaches herein can permit a memory device and/or a memory sub-system experiencing input voltage and/or input current degradation to be serviced and/or replaced in a non-emergency manner. Responsive to a determination that the notification criteria is not met, the flow can return to 332-1.

Figure 4:
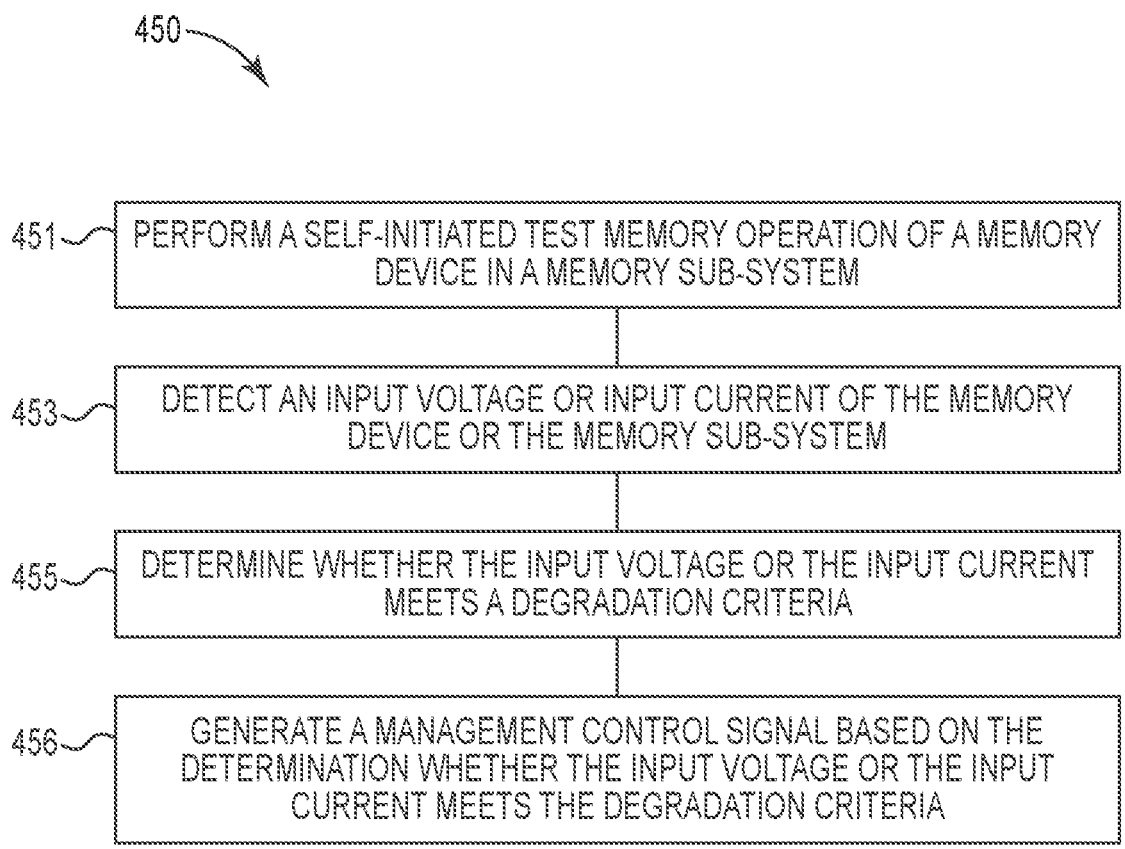
FIG. 4 is a flow diagram corresponding to a method of input voltage degradation detection in accordance with some embodiments of the present disclosure.

FIG. 4 is a flow diagram corresponding to a method of input voltage degradation detection in accordance with some embodiments of the present disclosure. The method 450 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 450 is performed by the input voltage degradation detection component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 451, a self-initiated test memory operation of a memory device in a memory-subsystem can be performed, as described herein. For instance, the self-initiated test memory operation can be performed periodically at a given interval. In some embodiments, the self-initiated test memory operation can be a read operation that is performed periodically at a given interval.

At 453, an input voltage or input current of the memory device or a memory sub-system in which the memory device is included can be detected by a sensor circuit. For instance, one or more sensor circuits can detect and transmit a respective signals indicative of a detected input voltage and/or a detected input current of the memory device or the memory sub-system to a controller in the memory sub-system.

At 455, a determination whether the detected input voltage and/or or the detected input current meets a degradation criteria can be made. For instance, the detected input voltage and/or the detected input current can be compared to a first input degradation criteria, a second input degradation criteria, and/or third input degradation criteria, as described herein.

At 456, a management control signal can be generated. For instance, a management control signal can be generated responsive to a determination that a respective degradation criteria is met or is not met as described herein. For instance, in some embodiments a management control signal can be generated responsive to a determination that a first degradation criteria is not met and/or responsive to a determination that a second criteria is met, among other possibilities. As mentioned, generation of the management control signal can cause a value indicative of the detected input voltage and/or detected input current to be stored in a data structure and/or can cause a counter to be incremented, as described herein. Moreover, generation of a management control signal can cause an incremented value of a counter to be compared to a counter threshold. When the counter threshold is met, (e.g., when the incremented count is equal to the counter threshold) a median voltage and/or current can be determined as described herein.

Figure 5:
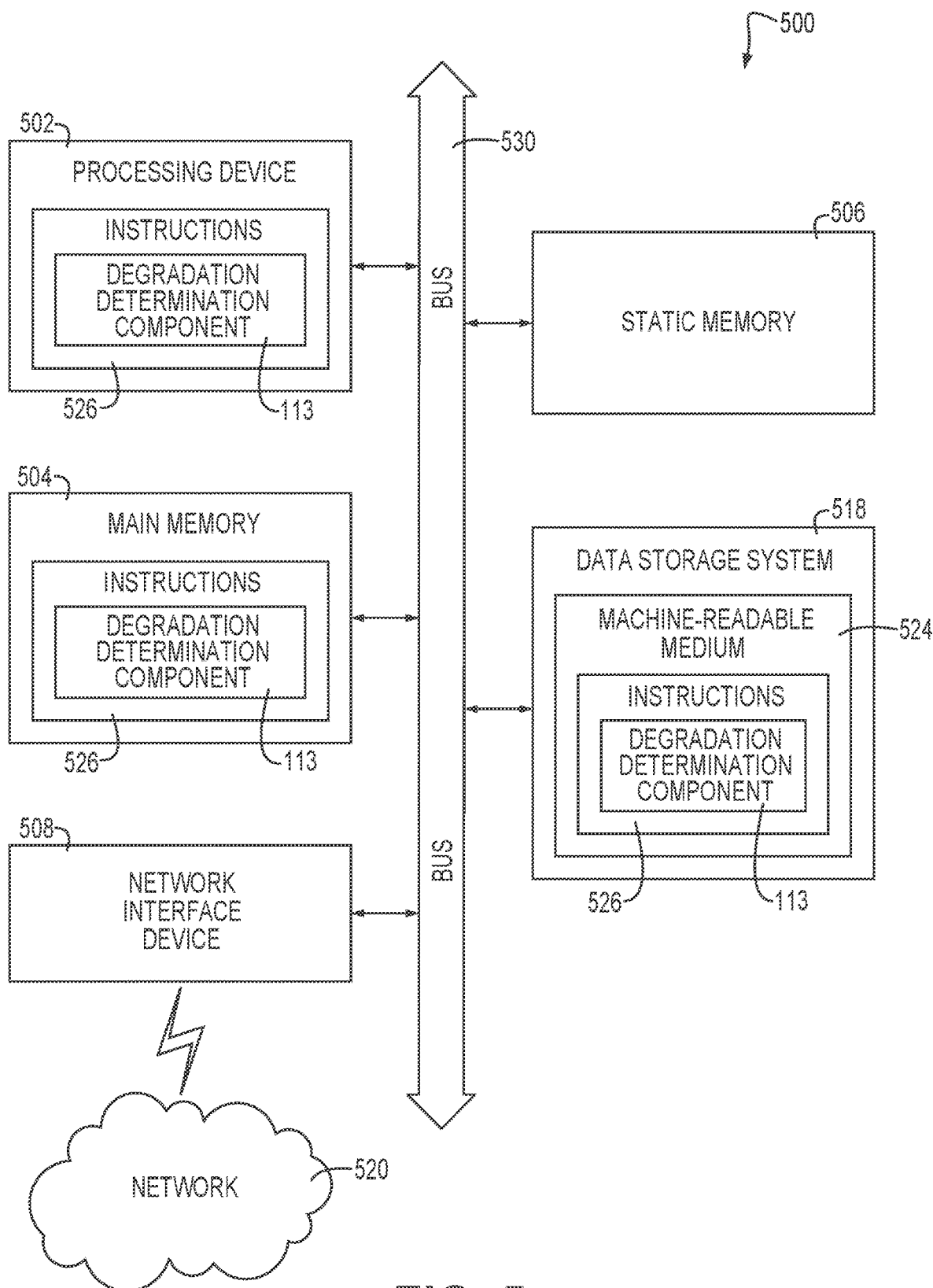
FIG. 5 is a block diagram of an example computer system in which embodiments of the present disclosure may operate.

FIG. 5 is a block diagram of an example computer system in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the input voltage degradation detection component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to an input voltage degradation detection component (e.g., the input voltage degradation detection component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    performing a self-initiated test memory operation of a memory device in a memory sub-system;
    in association with performing the self-initiated test memory operation detecting, via a sensor circuit, an input voltage or input current of the memory device or the memory sub-system;
    subsequent to detecting the input voltage or input current of the memory device or the memory sub-system, determining whether the detected input voltage or the detected input current meets a first pre-determined degradation criteria;
    responsive to a determination that the detected input voltage or the input current meets the first pre-determined degradation criteria, determine whether the detected input voltage or the input current meets a second pre-determined degradation criteria; and
    generating a management control signal based on, and subsequent to, the determination of whether the detected input voltage or the detected input current meets the second degradation criteria.

2. The method of claim 1, further comprising detecting the input voltage or the input current while performing the self-initiated test memory operation.

3. The method of claim 1, further comprising generating the management control signal to cause a counter to increment, storage of the input voltage of the memory device or the memory sub-system, or both.

4. The method of claim 1, wherein the self-initiated test memory operation is a read operation.

5. The method of claim 1, further comprising periodically performing the self-initiated test memory operation at a given interval.

6. The method of claim 1, wherein performing the self-initiated test memory operation further comprises:
    performing a plurality of self-initiated test memory operations; and
    detecting, via a sensor circuit, a respective input voltage or a respective input current of the memory device or the memory sub-system, for each self-initiated test memory operation of the plurality of self-initiated test memory operations.

7. The method of claim 6, wherein each of the self-initiated test memory operation of the plurality of self-initiated test memory operations are a same type of memory operation.

8. The method of claim 6, further comprising:
    receiving respective signals from the sensor circuit indicative of the respective input voltage or respective the input current for each self-initiated test memory operation of the plurality of self-initiated test memory operations;
    determining, based on the respective signals, a median input voltage or median input current; and
    storing the median input voltage or the median input current.

9. The method of claim 6, further comprising:
    generating the management control signal to cause:
    a counter to increment; and
    storage of the input voltage or input current of the memory device or the memory sub-system.

10. The method of claim 8, further comprising:
    generating a host notification responsive to a determination that:
    the median input voltage or the median input current meets a first notification criteria; or
    a quantity of the respective input voltages or the respective input currents that meet a degradation criteria meet a second notification criteria.

11. An apparatus comprising:
    a memory sub-system including a memory device, a sensor circuit, and a memory controller, the controller including an input voltage degradation detection component configured to:

receive, via the sensor circuit, an input voltage or an input current of the memory device or the memory sub-system during performance of a self-initiated test memory operation of the memory device;

determine whether the detected input voltage or the input current meets a first pre-determined degradation criteria;

responsive to a determination that the detected input voltage or the input current does not meet the first pre-determined degradation criteria, generate a management control signal;

responsive to a determination that the detected input voltage or the input current meets the first pre-determined degradation criteria, determine whether the detected input voltage or the input current meets a second pre-determined degradation criteria; and responsive to a determination that the detected input voltage or the input current meets the second pre-determined degradation criteria, generate a management control signal.

12. The apparatus of claim 11, wherein the sensor circuit is configured to detect the input voltage or the input current of the memory sub-system.

13. The apparatus of claim 11, wherein the sensor circuit is configured to detect the input voltage or the input current of the memory device.

14. The apparatus of claim 11, wherein the sensor circuit further comprises a plurality of sensor circuits including a first sensor circuit configured to detect the input voltage or the input current of the memory device and a second sensor circuit configured to detect the input voltage or the input current of the memory sub-system.

15. An apparatus comprising:
a memory sub-system including a memory device;
a sensor circuit; and
a controller configured to:
receive, via the sensor circuit, input voltages of the memory device or the memory sub-system during performance of a plurality of self-initiated test memory operations of the memory device;
responsive to a determination that a first input voltage of the input voltages does not meet a first degradation criteria, generate a management control signal to cause:
a value of a counter to increment to an incremented value; and
storage of the first input voltage;
responsive to a determination that a second input voltage of the input voltages meets the first degradation criteria, determine whether the second input voltage meets a second degradation criteria; and
responsive to a determination that the second input voltage the meets the second degradation criteria, generate a management control signal to cause:
the value of the counter to increment to the incremented value; and
storage of the second input voltage.

16. The apparatus of claim 15, wherein the controller is configured to:
responsive to a determination that the second input voltage does not meet the second degradation criteria, set a third degradation criteria;
receive, via the sensor circuit, a third input voltage of the memory device or the memory sub-system during performance of a self-initiated test memory operation of the memory device;
determine whether the third input voltage meets the third degradation criteria; and
responsive to a determination that the third input voltage does not meet the third degradation criteria, generate a management control signal to cause:
the value of the counter to increment to the incremented value; and
storage of the third input voltage.

17. The apparatus of claim 16, wherein the third degradation criteria is a value that is less than a value of the first degradation criteria and is greater than a value of the second degradation criteria.

18. The apparatus of claim 15, wherein the controller is configured to:
compare a value of the incremented counter to a count threshold; and
responsive to a determination that the value of the counter exceeds that count threshold, determine a median input voltage or median input current.

19. The apparatus of claim 15, wherein the controller is configured to perform the self-initiated test memory operation in an absence of host-initiated memory operation.

20. The apparatus of claim 15, wherein the controller is configured to perform the self-initiated test memory operation a threshold amount of time after performance of a previous self-initiated test memory operation.

* * * * *